US008805112B2

(12) United States Patent
Hong

(10) Patent No.: US 8,805,112 B2
(45) Date of Patent: Aug. 12, 2014

(54) IMAGE SHARPNESS CLASSIFICATION SYSTEM

(75) Inventor: Li Hong, San Diego, CA (US)

(73) Assignee: Nikon Corporation, Tokyo (JP)

( * ) Notice: Subject to any disclaimer, the term of this patent is extended or adjusted under 35 U.S.C. 154(b) by 168 days.

(21) Appl. No.: 13/640,458

(22) PCT Filed: Jun. 24, 2010

(86) PCT No.: PCT/US2010/039843
§ 371 (c)(1),
(2), (4) Date: Oct. 10, 2012

(87) PCT Pub. No.: WO2011/139288
PCT Pub. Date: Nov. 10, 2011

(65) Prior Publication Data
US 2013/0033608 A1 Feb. 7, 2013

Related U.S. Application Data

(60) Provisional application No. 61/332,132, filed on May 6, 2010.

(51) Int. Cl.
*G06K 9/40* (2006.01)
*H04N 5/232* (2006.01)
*G06K 9/03* (2006.01)
*G06K 9/00* (2006.01)
*G06T 7/00* (2006.01)

(52) U.S. Cl.
CPC ........ *G06K 9/00664* (2013.01); *H04N 5/23222* (2013.01); *G06K 9/036* (2013.01); *G06T 2207/30168* (2013.01); *G06T 7/0002* (2013.01); *H04N 5/23229* (2013.01)
USPC ............ 382/260; 382/159; 382/263; 382/264

(58) Field of Classification Search
USPC .......... 348/252, 606, 625; 382/159, 255, 263, 382/264
See application file for complete search history.

(56) References Cited

U.S. PATENT DOCUMENTS 5,974,159 A 10/1999 Lubin et al.
6,298,145 B1 10/2001 Zhang et al.
(Continued)

FOREIGN PATENT DOCUMENTS

WO WO 2010/008802 A1 1/2010
WO WO 2011/139288 A1 11/2011

OTHER PUBLICATIONS

PCT Notification Concerning Transmittal of International Preliminary Report on Patentability for PCT/US2010/039843, dated Nov. 6, 2012, Nikon Corporation.
(Continued)

*Primary Examiner* — Gregory F Cunningham
(74) *Attorney, Agent, or Firm* — Roeder & Broder LLP

(57) ABSTRACT

A method for predicting whether a test image (318) is sharp or blurred includes the steps of: providing a sharpness classifier (316) that is trained to discriminate between sharp and blurred images; computing a set of sharpness features (322) for the test image (318) by (i) generating a high pass image (404) from the test image (318), (ii) generating a band pass image (406) from the test image (318), (iii) identifying textured regions (408) in the high pass image, (iv) identifying texture regions (410) in the band pass image, and (v) evaluating the identified textured regions in the high pass image and the band pass image to compute the set of test sharpness features (412); and evaluating the sharpness features using the sharpness classifier (324) to estimate if the test image (318) is sharp or blurry (20).

31 Claims, 7 Drawing Sheets

(56) References Cited

U.S. PATENT DOCUMENTS

| | | | |
|---|---|---|---|
| 6,548,800 | B2 | 4/2003 | Chen et al. |
| 6,888,564 | B2 | 5/2005 | Caviedes |
| 6,987,530 | B2 | 1/2006 | McConica |
| 7,079,704 | B2 | 7/2006 | Caviedes |
| 7,119,854 | B2 | 10/2006 | Dantwala |
| 7,181,082 | B2 | 2/2007 | Feng |
| 7,257,273 | B2 | 8/2007 | Li et al. |
| 7,356,195 | B2 | 4/2008 | Shaked et al. |
| 7,519,231 | B2 | 4/2009 | Li et al. |
| 7,545,985 | B2 | 6/2009 | Zhang et al. |
| 7,586,520 | B2 | 9/2009 | Igarashi |
| 7,653,256 | B2 | 1/2010 | Kanda et al. |
| 7,668,388 | B2 | 2/2010 | Bryll |
| 8,391,626 | B2 * | 3/2013 | Takahashi et al. ............ 382/255 |
| 8,538,140 | B2 * | 9/2013 | Farid et al. ................... 382/159 |
| 2002/0145106 | A1 | 10/2002 | Chen et al. |
| 2003/0011717 | A1 | 1/2003 | McConica |
| 2003/0138163 | A1 | 7/2003 | Chen et al. |
| 2003/0219172 | A1 | 11/2003 | Caviedes et al. |
| 2004/0001633 | A1 | 1/2004 | Caviedes |
| 2004/0056174 | A1 | 3/2004 | Specht et al. |
| 2004/0066981 | A1 | 4/2004 | Li et al. |
| 2004/0081370 | A1 | 4/2004 | Murphy |
| 2004/0100217 | A1 * | 5/2004 | Neubauer ..................... 318/480 |
| 2004/0120598 | A1 | 6/2004 | Feng |
| 2005/0123214 | A1 | 6/2005 | Takahira |
| 2005/0244074 | A1 | 11/2005 | Shaked et al. |
| 2005/0244077 | A1 | 11/2005 | Kitamura et al. |
| 2006/0039593 | A1 | 2/2006 | Sammak et al. |
| 2006/0056731 | A1 | 3/2006 | Bouk et al. |
| 2006/0078217 | A1 | 4/2006 | Poon et al. |
| 2006/0078218 | A1 | 4/2006 | Igarashi |
| 2006/0147107 | A1 | 7/2006 | Zhang et al. |
| 2006/0147125 | A1 | 7/2006 | Caviedes |
| 2006/0153471 | A1 | 7/2006 | Lim et al. |
| 2006/0188170 | A1 | 8/2006 | Kanda et al. |
| 2006/0204121 | A1 | 9/2006 | Bryll |
| 2007/0071346 | A1 | 3/2007 | Li et al. |
| 2007/0177805 | A1 | 8/2007 | Gallagher |
| 2007/0263897 | A1 | 11/2007 | Ong et al. |
| 2008/0013861 | A1 | 1/2008 | Li et al. |
| 2008/0226148 | A1 | 9/2008 | Gu et al. |
| 2009/0016616 | A1 | 1/2009 | Kasahara |
| 2009/0079862 | A1 | 3/2009 | Subbotin |
| 2009/0116713 | A1 | 5/2009 | Yan et al. |
| 2010/0061642 | A1 | 3/2010 | Kondo et al. |
| 2011/0019909 | A1 | 1/2011 | Farid |

OTHER PUBLICATIONS

Ming-Yang Yu et al., Smart Album—Photo Filtering by Effect Detections, SIGGRAPH 2008, Aug. 11-15, 2008, ISBN 978-1-60558-466-9/08/20008, Los Angeles, CA.

Renting Liu et al., Image Partial Blur Detection and Classification, Dept. of Computer Science and Engineering, The Chinese University of Hong Hong, {rtliu,zrli, leojia}©cse.cuhk.edu.hk.The work described in this paper was fully supported by a grant from Research Grants Council of Hong Kong Special Administrative Region, China (Project No. 412307).

Robert A. Gonsalves, Phase retrieval and diversity in adaptive optics, Optical Engineering Sep./Oct. 1982, vol. 21 No. 5, ©1982 Society of Photo-Optical Instrumentation Engineers.

B. Zhang, J.P. Allebach and Z. Pizlo, "An investigation of Perceived Sharpness and Sharpness Metrics," 2005, Proc. SPIE vol. 5668, Dept. of Psychological Sciences, Purdue University.

F. Crete, T. Dolmiere, P. Ladret and M. Nicolas "The Blur Effect: Perception and Estimation with a New No-Reference Perceptual Blur Metric", 2007, Proc. SPIE vol. 6492, author manuscript, hal-00232709, version 1-Feb. 1, 2008, published in SPIE Electronic Imaging Symposium Conf Human Vision and Electronic Imaging, San Jose (2007).

I.V. Safonov, M.N. Rychagov, K. Kang and S.H. Kim, "Adaptive sharpening of photos," (Proceedings Paper) 2008, Proc. SPIE vol. 6807 (2008) Samsung Research Center, Moscow Russia 125047; Samsung Digital Printing Division, Suwon, Korea 443-742.

D. Shaked and I. Tastl, "Sharpness Measure: Towards Automatic Image Enhancement," 2007, SPIE vol. 6492 presented IEEE International Conference on Image Processing, © Copyright 2005 Hewlett-Packard Development Company, L.P.

S.H. Lim, J. Yen and P. Wu, "Detection of Out-Of-Focus Digital Photographs", Jan. 20, 2005, HPL-2005-14, HP Labs Technical Report, © Copyright Hewlett-Packard Company 2005.

International Search Report and Written Opinion for PCT/US2009/048165, dated Aug. 14, 2009, Nikon Corporation.

PCT Notification of Transmittal of International Preliminary Report on Patentability for PCT/US2009/048165, dated Mar. 27, 2012, Nikon Corporation.

Ping Hsu and Bing-Yu Chen, Blurred Image Detection and Classification, MMM 2008, pp. 277-286, LNCS 4903, ©2008 Springer-Verlag Berlin Heidelberg.

International Search Report and Written Opinion for PCT/US2010/039843, dated Aug. 19, 2010, Nikon Corporation.

* cited by examiner

| 0 | 1 | 1 | 0 | 0 |
|---|---|---|---|---|
| 0 | 0 | 1 | 1 | 1 |
| 0 | 1 | 1 | 0 | 0 |
| 0 | 0 | 0 | 0 | 0 |
| 0 | 0 | 0 | 0 | 1 |

| 0 | 0 | 1 | 0 | 0 |
|---|---|---|---|---|
| 1 | 1 | 0 | 0 | 0 |
| 0 | 0 | 1 | 1 | 0 |
| 1 | 1 | 1 | 1 | 0 |
| 0 | 0 | 0 | 0 | 0 |

Fig. 5C　　　　　　　　　　　Fig. 5D

IMAGE SHARPNESS CLASSIFICATION SYSTEM

BACKGROUND

Cameras are commonly used to capture an image of a scene that includes one or more objects. Unfortunately, some of the images are blurred. For example, movement of the camera and/or movement of the objects in the scene during the exposure time of the camera can cause the image to be blurred. Further, if the camera is not properly focused when the image is captured, that image will be blurred.

As digital photography becomes more and more popular, image quality assessment such as sharpness measurement has been a topic of great interest. Sharpness is generally described as the measurement of either the clarity of details or the transition of edges inside image. Currently, there are certain methods that are used to evaluate the sharpness of an image. Unfortunately, existing systems do not accurately and consistently evaluate the level of sharpness over a broad variety of images. Additionally, it has been a specially challenging task to attain robust performance for specific image types, such as high noise, macros, close-up portraits and night scenes.

SUMMARY

The present invention is directed to a method for predicting whether a test image is blurred. In one embodiment, the method includes the steps of: training a sharpness classifier, and applying the trained classifier to the test image to determine if the test image is sharp or blurred based on a set of test sharpness features computed from the test image. The sharpness classifier is trained to discriminate between sharp and blurred images using a set of training sharpness features computed from a plurality of training images, the training images including both sharp images and blurred images. As provided herein, the set of training sharpness features for each training image and the set of test sharpness features for each test image are computed by (i) preprocessing of the respective image; (ii) generating a high pass image from the preprocessed image; (iii) generating a band pass image from the preprocessed image; (iv) identifying textured regions in the high pass image; (v) identifying texture regions in the band pass image; and (vi) computing the set of sharpness features from the identified textured regions.

For example, the step of preprocessing of the respective image can include the steps of: (i) border-cropping; (ii) down-sampling; and (iii) converting the image into a grey scale image.

In one embodiment, the step of generating the high pass image includes computing the absolute difference between the preprocessed image and a low pass filtered version of the preprocessed image. Further, the step of generating the band pass image includes the step of computing the absolute difference between two levels of low pass filtering of the preprocessed image. For example, the step of computing the absolute difference between the two levels of low pass filtering can include the steps of: (i) generating a first level low pass filtered image from the preprocessed image; (ii) generating a second level low pass filtered image from the first level low pass filtered image; and (iii) generating the band pass image by subtracting the second level low pass filtered image from the first level low pass filtered image. In one embodiment, the steps of generating a high pass image and generating a band pass image include utilizing an omni-directional type filter.

As provided herein, the step of identifying the textured regions in the high pass image can include the steps of: constraining texture regions in the high pass image to be pixels with values in the high pass image that exceed a preset texture threshold; and constraining texture regions in the high pass image to be pixels with corresponding gradient values exceed a preset gradient threshold.

Somewhat similarly, the step of identifying the textured regions in the band pass image can include the steps of: constraining texture regions in the band pass image to be pixels with values in the band pass image that exceed a preset texture threshold; and constraining texture regions in the band pass image to be pixels with corresponding gradient values exceed a preset gradient threshold.

In certain embodiment, if there is motion blur in the test image, the test image is handled slightly differently. More specifically, in this embodiment, the test image is first evaluated to ascertain if there is motion blur in the test image. If there is no motion blur detected, the test sharpness features are calculated as described above. Alternatively, if there is motion blur detected, the test sharpness features are calculated using one or more oriented filters.

In the embodiments provided herein, the set of sharpness features can be generated by computing one or more of the following image sharpness features: (i) a measure of the texture percentage in image; (ii) a measure of the mean energy in the textured regions of the high pass image; (iii) a measure of the mean energy in the textured regions of the band pass image; (iv) a measure of the ratio of mean energy difference between textures in the band pass image to the mean energy of textures in the high pass image; (v) a measure of the mean ratio of per texture pixel energy in the band pass image to the combined energy of the band pass image and the high pass image.

In certain embodiments, the method includes identifying metadata associated with the test image; and using the metadata associated with the test image to aid in determining if the test image is sharp or blurred. For example, the metadata can include one or more of the following: ISO noise level associated with the test image; an exposure value associated with the test image; magnification factor associated with the test image; and a depth of field factor associated with the test image.

Additionally, the present invention can include the steps of identifying a test image with high noise level based on the ISO value; and reducing noisy pixels in texture regions in the high pass image and reducing noisy pixels in the texture regions in the oriented high pass image if motion blur is detected inside the image.

Moreover, the method can include identifying a test image with very low exposure value; and removing pixels associated with highlights in the texture regions in the high pass image and the band pass image and removing pixels associated with highlights in the texture regions in the oriented high pass and the oriented band pass image if motion blur is detected in the image.

Further, the method can include identifying a test image with high magnification factor; and slightly relaxing sharpness standard for the test image.

Moreover, the method can include identifying a test image with very shallow depth of field, and removing weak texture structures in the texture regions of the high pass image and removing weak texture structures in the texture regions of the oriented high pass image if motion blur is detected in the image.

Additionally, the present invention is directed to a method comprising the steps of: providing a sharpness classifier that is trained to discriminate between sharp and blurred images; computing a set of test sharpness features for the test image by (i) preprocessing the test image; (ii) generating a test high pass image from the preprocessed image; (iii) generating a test band pass image from the preprocessed image; (iv) identifying test textured regions in the test high pass image and the test band pass image; and (v) evaluating the identified test textured regions in the test high pass image and the test band pass image to compute the set of test sharpness features; and evaluating the test sharpness features using the sharpness classifier to estimate if the test image is sharp or blurry.

In this embodiment, the step of training the sharpness classifier can include the step of computing the set of training sharpness features for each training image by (i) preprocessing the test image; (ii) generating a training high pass image from the preprocessed image; (iii) generating a training band pass image from the preprocessed image; (iv) identifying training textured regions in the training high pass image and the training band pass image; and (v) evaluating the identified training textured regions in the training high pass image and the training band pass image to compute the set of training sharpness features.

Moreover, the present invention is direct to a camera that performs the procedures described herein. Alternatively, the present invention can be utilized in a personal computer for post-processing of one or more images, or on an on-line site for post-processing of one or more images.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 5A is a simplified illustration of a portion of a high pass filtered image having features of the present invention;

FIG. 5B is a simplified illustration of a portion of a band pass filtered image having features of the present invention;

FIG. 5C is a simplified illustration the textured regions of the portion of the high pass filtered image of FIG. 5A;

FIG. 5D is a simplified illustration the textured regions of the portion of the band pass filtered image of FIG. 5B;

DESCRIPTION

Figure 1:
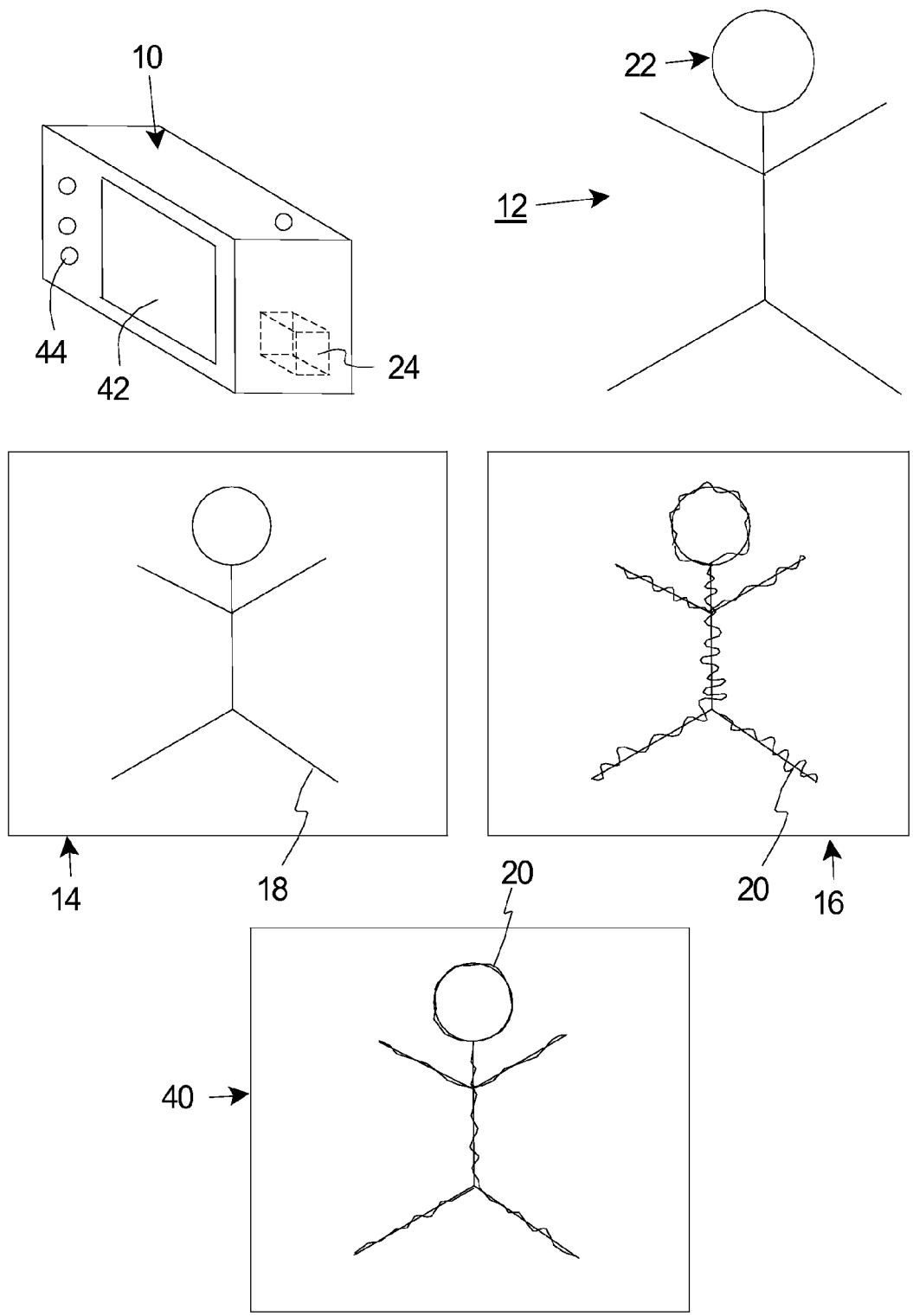
FIG. 1 is a simplified view of a scene, an image apparatus having features of the present invention, a raw, first captured image of the scene, a raw, second captured image of the scene, and an adjusted image.

FIG. 1 is a simplified perspective view of an image apparatus 10 having features of the present invention, and a scene 12. FIG. 1 also illustrates a raw first captured image 14 (illustrated away from the image apparatus 10), and a raw second captured image 16 (illustrated away from the image apparatus 10), each captured by the image apparatus 10. In FIG. 1, the first captured image 14 is intended to illustrate a sharp image 18 (including non-wavy lines) and the second captured image 16 is intended to illustrate image blur 20 (including wavy lines). For example, movement of the image apparatus 10, and/or movement of an object 22 in the scene 12 during the capturing of the blurred image 16 can cause motion blur 20 in the image 14. Additionally, or in the alternative, blur 20 in the image 16 can be caused by the image apparatus 10 not being properly focused when the image 14 is captured.

In one embodiment, as provided herein, the image apparatus 10 includes a control system 24 (illustrated in phantom) that uses a unique method for estimating if one or more of the captured images 14, 16 is blurred or sharp with improved accuracy. Subsequently, a deblurring process can be applied to only the images 16 that are determined to be blurred. Thus, a sharp image 14 will not be unnecessarily subjected to the deblurring process.

As an overview, in certain embodiments, the control system 24 uses a learning-based image sharpness classification algorithm that automatically detects whether the image 14, 16 is sharp or blurred. In one embodiment, the algorithm utilizes a sharpness classifier that is trained based on a set of novel sharpness features that relate to image sharpness. For any new image 14, 16, similar sharpness features are calculated and passed as input to the trained sharpness classifier to predict whether the image 14, 16 is sharp or blur. In certain embodiments, the sharpness classifier focuses on the task of image sharpness classification instead of a precise sharpness measurement, thereby providing an automatic tool for users to quickly identify sharp images 14 or blurred images 16 from large image collections. Robustness is one of the main advantages of a learning-based sharpness classification over other single feature sharpness measurement systems. Moreover, the present algorithm detects out-of-focus blur as well as motion blur in the images 14, 16.

As provided herein, the sharpness features are designed to capture information from texture regions in high-pass and band pass images derived from the original image 14, 16. The choices of sharpness features are crucial in a learning-based classification algorithm, because the sharpness features directly influence the classification performance. Additionally, in certain embodiments, several unique adjustments in computation of the sharpness features are used to accommodate the different sharpness characteristics of some challenging image types, such as high noise images, night scene/indoor scene images, macro/close-up images, etc.

Further, with the algorithm provided herein, the control system 24 is able to quickly and accurately detect blurry images.

The type of scene 12 captured by the image apparatus 10 can vary. For example, the scene 12 can include one or more objects 22, e.g. animals, plants, mammals, and/or environments. For simplicity, in FIG. 1, the scene 12 is illustrated as including one object 22. Alternatively, the scene 12 can include more than one object 22. In FIG. 1, the object 22 is a simplified stick figure of a person, although it is recognized that the object 22 in FIG. 1 can be any object 22 and is representative of any suitable image. For instance, the scenes 12 can include macros, close-up portraits and/or night scenes, as non-exclusive examples.

Figure 2:
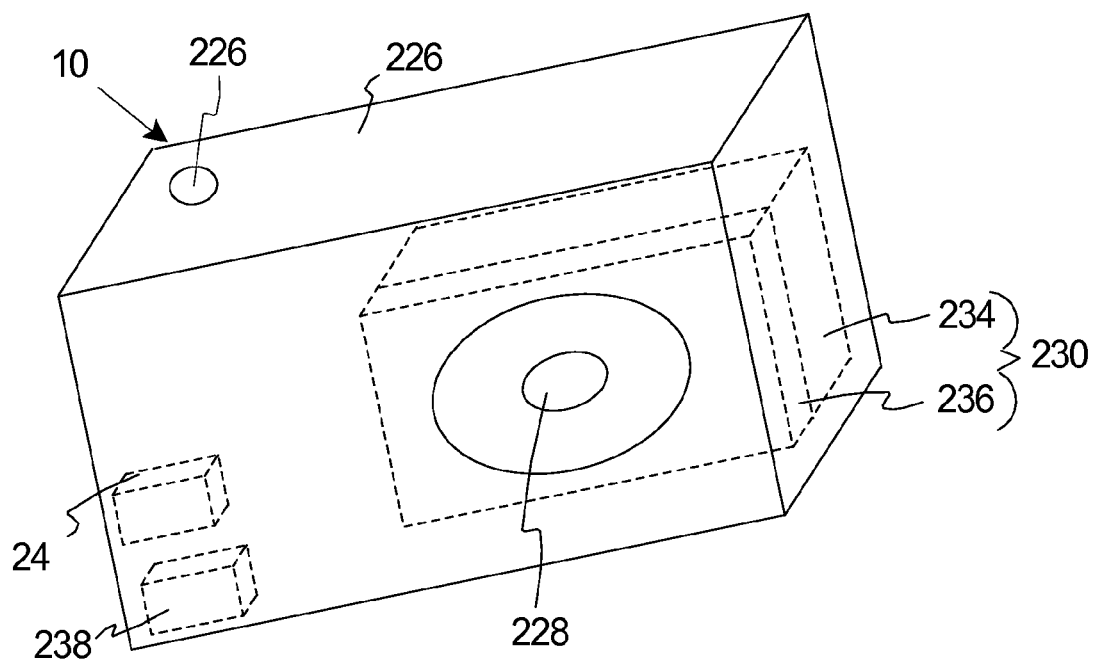
FIG. 2 is a simplified front perspective view of the image apparatus in FIG. 1.

FIG. 2 illustrates a simplified, front perspective view of one non-exclusive embodiment of the image apparatus 10. In this embodiment, the image apparatus 10 is a digital camera, and includes an apparatus frame 226, an optical assembly 228, and a capturing system 230 (illustrated as a box in phantom), in addition to the control system 24 (illustrated as a box in phantom). The design of these components can be varied to suit the design requirements and type of image apparatus 10. Further, the image apparatus 10 could be designed without one or more of these components. Additionally or alternatively, the image apparatus 10 can be designed to capture a video of the scene 12.

The apparatus frame 226 can be rigid and support at least some of the other components of the image apparatus 10. In one embodiment, the apparatus frame 226 includes a generally rectangular shaped hollow body that forms a cavity that receives and retains at least some of the other components of the camera. The apparatus frame 226 can include a shutter button 232 that causes the capturing system 230 to capture the image.

The optical assembly 228 can include a single lens or a combination of lenses that work in conjunction with each other to focus light onto the capturing system 230. In one embodiment, the image apparatus 10 includes an autofocus assembly (not shown) including one or more lens movers that move one or more lenses of the optical assembly 228 in or out until the sharpest possible image of the subject is received by the capturing system 230.

The capturing system 230 captures information for the images 14, 16 (illustrated in FIG. 1). The design of the capturing system 230 can vary according to the type of image apparatus 10. For a digital-type camera, the capturing system 230 includes an image sensor 234 (illustrated in phantom) e.g.

charge coupled device, a filter assembly 236 (illustrated in phantom) e.g. a Bayer filter, and a storage system 238 (illustrated in phantom). The storage system 254 can be fixedly or removable coupled to the apparatus frame 226. Non-exclusive examples of suitable storage systems 254 include flash memory, a floppy disk, a hard disk, or a writeable CD or DVD.

The control system 24 is electrically connected to and controls the operation of the electrical components of the image apparatus 10. The control system 24 can include one or more processors and circuits, and the control system 24 can be programmed to perform one or more of the functions described herein. In FIG. 2, the control system 24 is secured to the apparatus frame 226 and the rest of the components of the image apparatus 10. Further, in this embodiment, the control system 24 is positioned within the apparatus frame 226 for in camera processing of the images. Alternatively, the control system that utilizes the algorithm disclosed herein can be separate from the camera (e.g. a computer) that performs post-processing on the images 14, 16.

The control system 24 includes software and/or firmware that utilizes one or more methods to determine if a given image 14, 16 is sharp or blurred. In various embodiments, the control system 24 includes firmware that has previously been programmed or "trained" during the manufacturing process that predicts whether a new image 14, 16 (also sometimes referred to herein as a "test image") subsequently taken by the image apparatus 10 is sharp or blurred.

Further, referring back to FIG. 1, in certain embodiments, the control system 24 can include software that reduces the amount of blur 20 in the blurred image 16 to provide an adjusted image 40. In this example, the control system 24 can determine that the first image 14 is sharp and that no further processing is necessary. Further, the control system 24 can determine that the second image 16 is blurred. Subsequently, the control system 24 reduces the blur in the second image 16 to provide the adjusted image 40.

The image apparatus 10 can include an image display 42 that displays the raw images 14, 16 and/or the adjusted image 40. With this design, the user can decide which images 14, 16, 40, should be stored and which images 14, 16, 40, should be deleted. Further, the image display 42 can display other information that can be used to control the functions of the image apparatus 10.

Moreover, the image apparatus 10 can include one or more control switches 44 electrically connected to the control system 24 that allows the user to control the functions of the image apparatus 10. For example, one or more of the control switches 44 can be used to selectively switch the image apparatus 10 to the blur evaluation and reduction processes disclosed herein. For example, in certain embodiments, in order to save computation, the present invention can be selectively applied (manually or automatically) to only certain types of images, e.g. close up portraits/statutes, macros, low light images, etc.

Figure 3:
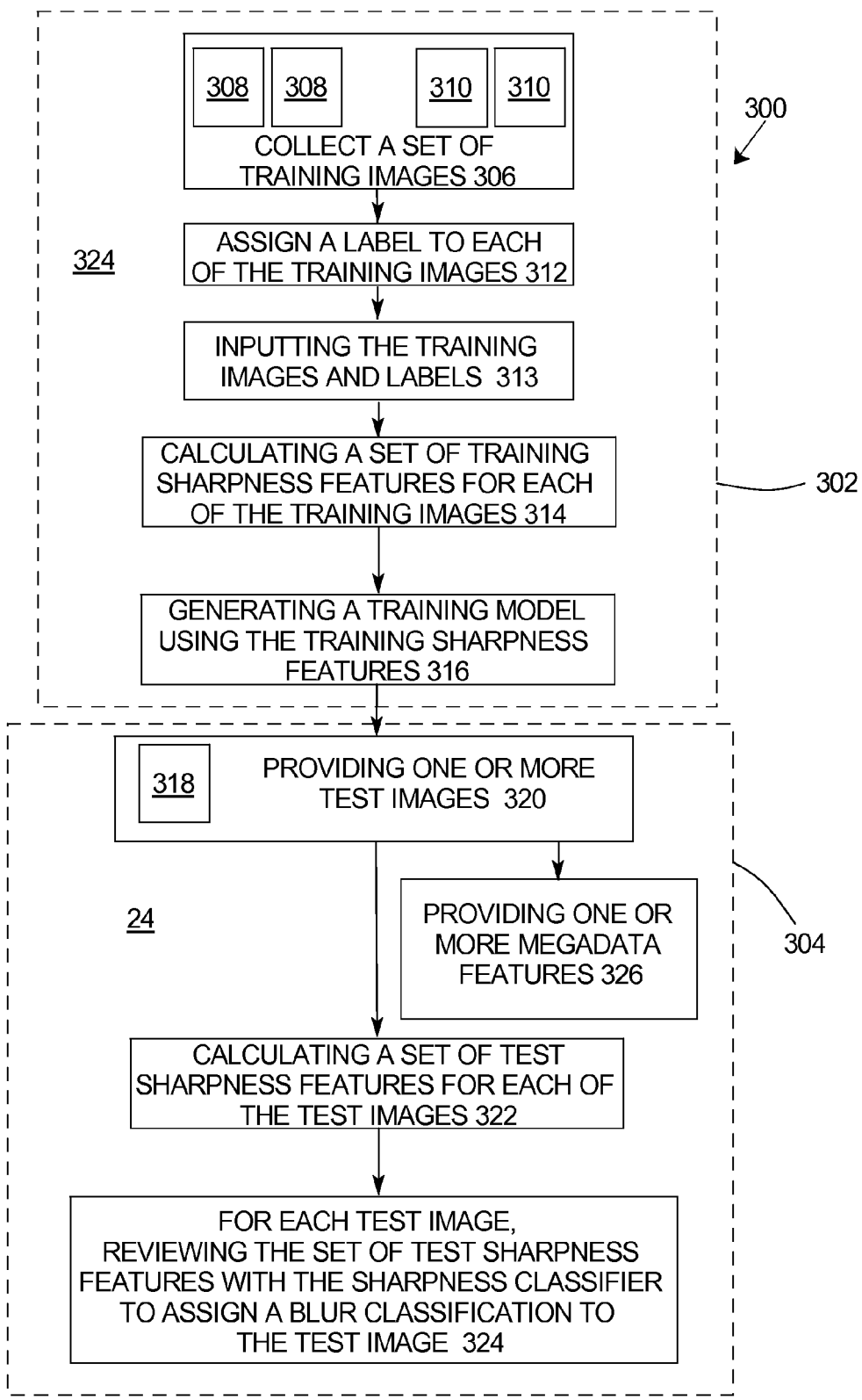
FIG. 3 is a flow chart that illustrates one embodiment of an image classification procedure having features of the present invention.

FIG. 3 is a flow chart that illustrates one embodiment of an image detection process 300 having features of the present invention. In this embodiment, the image detection process 300 can include a training phase 302 (illustrated as dashed box) and a predicting phase 304 (illustrated as dashed box). With the present invention, the detection process 300 utilizes a robust learning-based classification framework.

The training phase 302 can include one or more of the following steps:
  (i) at step 306, collecting a set of training images (also sometimes referred to herein as a "training image set") composed of sharp training images 308 (only two are illustrated as boxes) and blurry training images 310 (only two are illustrated as boxes);
  (ii) at step 312, assigning a sharp label or a blur label to the training images;
  (iii) at step 313, inputting the set of training images and their respective labels into the control system;
  (iv) at step 314, calculating a set of training sharpness features for each of the training images; and
  (v) at step 316, generating a training model (also sometimes referred to herein as a "classifier") using the training sharpness features from the training images.

It should be noted that one or more of the steps of the training phase 302 can be performed by a separate control system 324 (e.g. a computer) and subsequently the training model 316 can be input into the control system 24 of the camera 10 for in camera blur classification. Alternatively, for example, some of the steps of the training phase 302 and some of the steps of the predicting phase 304 can be performed by a control system that is remote from the camera.

The number of training images 308, 310 in the set of training images 306 can be varied. However, in general, a greater number of training images 308, 310 used during the training phase 302 will increase the accuracy during the predicting phase 304. For example, hundreds or even thousands or more of sharp and blurry training images 308, 310 can be used during the training phase 302. In certain embodiments, the real-life sharp and blurred training images are selected to cover wide varieties of image types, camera settings, etc. Further, in certain embodiments, one or more of the blurry training images 310 can be generated from sharp images that were artificially blurred.

At step 312 above, the training images 308, 310 are subjectively and/or objectively classified based on the opinion(s) of one or more persons with skills or expertise at determining sharp versus blurred images. Ideally, this classification step should include a substantially consistent classification protocol of all training images 308, 310 reviewed during the classification step 360.

At step 314, the set of training sharpness features 314 for each of the training images 308, 310 is collected. In one embodiment, for each of the training images 308, 310, the training sharpness features are computed using information from textured regions in a high pass image and a band pass image for each respective training images 308, 310. The process used and examples of suitable training sharpness features are described in more detail below.

After the sets of training sharpness features are collected, the calculated sets of training sharpness features are input into the classification algorithm to generate the sharpness classifier at step 316. Stated in another fashion, the sharpness classifier is trained based on the sets of training sharpness features, aiming to best capture the difference between the sharp training images 308 and the blurred training images 310. In one non-exclusive embodiment, a linear classification algorithm such as linear discriminant analysis (LDA) is used due to its simplicity and efficiency. Alternatively, for example, another type of classical learning algorithm, such as support vector machines (SVM) can be utilized.

The predicting process 304 can include one or more of the following steps:
  (i) at step 320, providing one or more new images 318 (sometimes referred to as a "test image" and only one is illustrated with a box) to the control system (whether these new images 318 are sharp or blurred is unknown);
  (ii) at step 322, calculating a set of test sharpness features for each of the test images; and
  (iii) at step 324, for each test image, reviewing the set of test sharpness features with the trained sharpness classifier to predict whether the test image is either sharp or blurred (sometimes referred to as "assigning a blur classification").

At step 320, the one or more test images 318 are provided to the control system 24. In one embodiment, this step is done by capturing the one or more test images 318 with the capturing system 230 described above and illustrated in FIG. 2. Alternatively, one or more previously captured test images 318 can be provided to the control system 24.

In one embodiment, at step 326, one or more metadata features for each test image 318 can also be provided to the control system 24 during the predicting process 304. The one or more metadata features 326 can be collected during the capturing of the test image 318. For example, the one or more metadata features 326 can include focal length, f-number, exposure time, ISO sensitivity, whether or not a flash was used to take the original image, an exposure value and/or a handholdable factor (X). Each of these metadata features 326 is a standard feature for a typical image apparatus 10 such as a digital camera. In an alternative embodiment, the metadata features 326 are not collected and are not utilized during the predicting process 304.

At step 322, the set of test sharpness features for each test image 318 is calculated. In one embodiment, for each test image 318, the set of test sharpness features are computed in the same manner as the training sharpness features for each training image. More specifically, for each test image 318, the test sharpness features are computed using information from textured regions in high pass image and band pass image for each respective test image 318. The process used and examples of suitable test sharpness features are described in more detail below.

Figure 4:
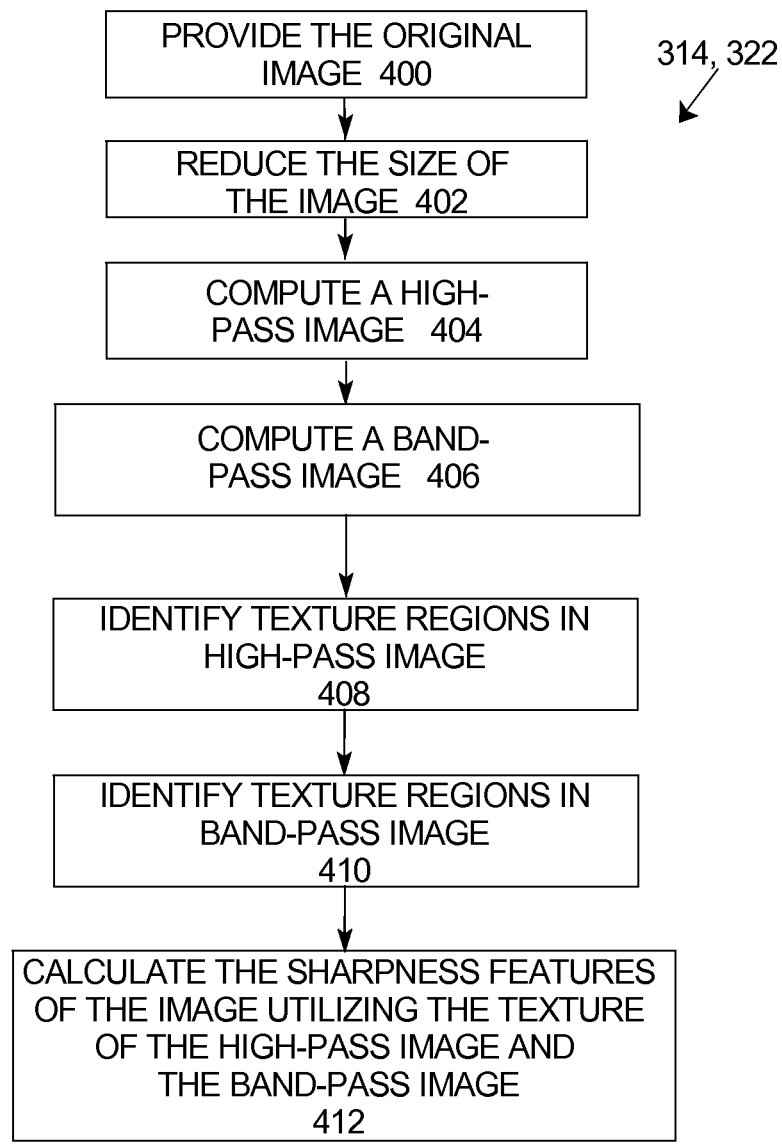
FIG. 4 is a flow chart that illustrates one embodiment of the steps used for calculating a set of sharpness features.

FIG. 4 is a flow chart that illustrates one embodiment of the steps used for calculating the set of training sharpness features for each training image (step 314 in FIG. 3) and the set of test sharpness features for each test image (step 322 in FIG. 3). As mentioned above, the process used to calculate the set of training sharpness features 314 for each of the training images 308, 310 is the same as the process used to calculate the set of test sharpness features 322 for each the test image 318. Thus, the processes will be described concurrently.

The method for calculating each set of sharpness features 314, 322 can include one or more of the following steps:
  (i) at step 400, an image "OG" is provided to the control system;
  (ii) at step 402, the original image "OG" is preprocessed to create a preprocessed image "RG" (because this step is optional as provided below, either or both the image "OG" and the preprocessed image "RG" can be referred to as image "G").
  (iii) at step 404, a high pass image "$D_1$" is computed from the image "G";
  (iv) at step 406, a band pass image "$D_2$" is computed from the image "G";
  (v) at step 408, the texture regions in the high pass image "$D_1$" are identified;
  (vi) at step 410, the texture regions in the band pass image "$D_2$" are identified; and
  (vii) at step 412, the set of sharpness features for the image "G" are calculated utilizing the textured regions of the high pass image "$D_1$", and the textured regions of the band pass image "$D_2$".

It should be noted that one or more of the steps 400-412 can be omitted without deviating from the spirit of the present invention. For example, step 402 can omitted and the image can be processed without being simplified. Further, the order of one or more of the steps can be changed.

As provided above, at step 400, the image "OG" is provided to the control system. The image "OG" can be one of the training images 308, 310 or one of the test images 318 because the sharpness features for each are calculated in the same fashion. The image "OG" can be a color image or a gray-scale image.

Subsequently, at step 402, the size of the image "OG" is reduced to reduce the computational cost for the algorithm and increase the speed in which the set of sharpness features of the image "G" can be calculated. This is particularly important for the embodiments in which the control system 24 of the camera 10 performs the predicting process 304. To save cost and size, the performance of a control system for a camera is generally limited. Thus, in order to quickly calculate the set of test sharpness features with the camera for in camera blur prediction, it is generally desirable to reduce the size of the original test image. Further, because, the training images and the test images are processed similarly, the size of the training images can be reduced in a similar fashion.

In one embodiment, during the preprocessing of the image "OG", (i) the original image "OG", if it is a color image can be converted to a grayscale image; (ii) the border of the image "OG" can be cropped (e.g. in alternative, non-exclusive example, the remaining center of the image after border cropping is approximately forty, fifty, or sixty percent of the image) because the user is typically primarily concerned with the center of the image, and/or (iii) the image "OG" can be down sampled (e.g. sub-sampled by a downsizing factor of one-third "⅓" or one-fourth "¼"). The order of steps (i)-(iii) can be varied. Further, the reduction process can exclude one or more the steps (i), (ii), or (iii). For example, if the steps are performed in the order (i), (ii), (iii), the color image "OG" is converted to a grayscale image "GG", the border of the grayscale image "GG" is cropped to create a cropped grayscale image "CGG", and the cropped grayscale image "CGG" is sub-sampled to provide the reduced size image "RG". For typical images "G" the sub-sampling can be approximately by a factor of one-third. Alternatively, as discussed in more detail below, for macro/close-up type images G, the downsizing factor one-fourth can be used to get a slightly sharper version than that from using the downsizing factor of one-third.

Additionally, each image "G" can be auto-scaled to [0 255], by increasing or decreasing the contrast as needed, for example.

Next, at step 404, the high pass filtered image "$D_1$" is computed from the image "G". In one embodiment, a low-pass filtered image "$B_1$" is created from the image "G" using a low-pass filter "H" (e.g. a Gaussian filter or binomial filter). This is expressed in equation 1 below:

$$B_1 = H*G,\qquad\text{Equation 1}$$

In certain embodiments, the low-pass filter "H" is omni-directional. Alternatively, as described below, the low-pass filter "H" can be oriented.

Subsequently, the high pass image "$D_1$" can be computed as the absolute difference between the image G and its low-pass filtered image "$B_1$". This is expressed in Equation 2 below:

$$D_1 = |G - B_1|\qquad\text{Equation 2}$$

Alternatively, the high pass image "$D_1$" can be directly computed by applying a high pass filter "X" to the image "G". This is expressed in equation 3 below:

$$D_1 = X*G,\qquad\text{Equation 3}$$

In certain embodiments, the high pass filter "X" is omni-directional. Alternatively, as described below, the high pass filter "X" can be oriented.

Figures 5A, 5B, 5C, 5D:
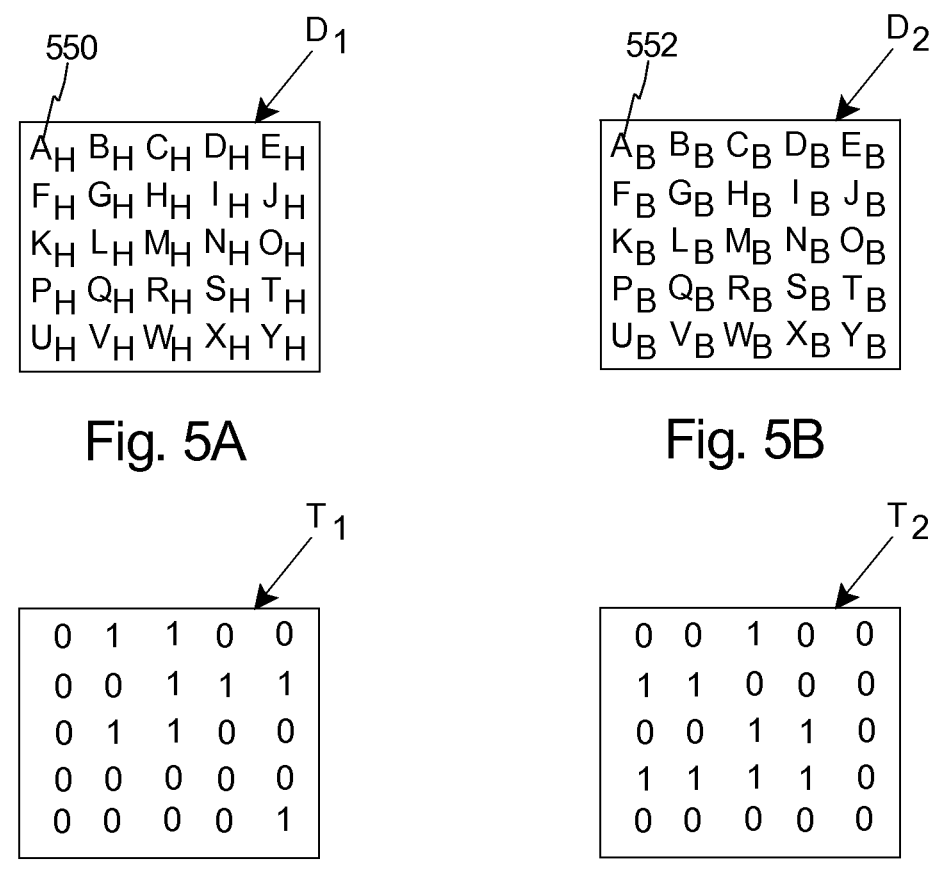

FIG. 5A is a simplified illustration of a portion of a high pass image "$D_1$". It should be noted that the high pass image "$D_1$" is comprised of a plurality of pixels 550 (only a few representative pixels are illustrated in FIG. 5A) and each pixel 550 has its own value. In this example, the high pass image "$D_1$" is illustrated as a five by five pixel array for simplicity. However, a typical high pass image "$D_1$" will be comprised of thousands or millions of pixels 550 (depending on the amount of reduction in step 402 and the design and settings of the camera that captured the image).

Next, at step 406, the band pass filtered image "$D_2$" is computed from the image "G". In one embodiment, the band pass image $D_2$ is computed as the absolute difference between two levels of low-pass filtered images. For example, a second level low-pass filtered image "$B_2$" can be created by re-applying the low-pass filter "H" (e.g. a Gaussian filter or binomial filter) to the first level low-pass filtered image "$B_1$". This is expressed in equation 4 below:

$$B_2 = H*B_1,\qquad\text{Equation 4}$$

Alternatively, a first level filter can be applied to the image "G" to create the first level low-pass filtered image "$B_1$", and a separate, second level filter can be applied to the image "G" to create the second level low-pass filtered image "$B_2$".

In certain embodiments, the filter(s) is/are omni-directional. Alternatively, as described below, the filter(s) can be oriented.

Subsequently, the band pass image "$D_2$" can be computed as the absolute difference between the first level low-pass filtered image "$B_1$", and the second level low-pass filtered image "$B_2$". This is expressed in Equation 5 below:

$$D_2 = |B_1 - B_2|\qquad\text{Equation 5}$$

FIG. 5B is a simplified illustration of a portion of a band pass filtered image "$D_2$". It should be noted that the band pass filtered image "$D_2$" is comprised of a plurality of pixels 552 (only a few representative pixels are illustrated in FIG. 5B) and each pixel 552 has its own value. In this example, the band pass filtered image "$D_2$" is illustrated as a five by five pixel array for simplicity. However, a typical band pass filtered image "$D_2$" will be comprised of thousands or millions of pixels 552 (depending on the amount of reduction in step 402 and the design and settings of the camera that captured the image). It should be noted that the band pass filtered image "$D_2$" should be the same size as the high pass image "$D_1$" because they are generated from the same image "G".

Next, at step 408, the textured regions in the high pass image "$D_1$" are identified. As provided herein, the pixels 550 of the high pass image "$D_1$" can be characterized based on the texture of the areas that they capture. For example, the high pass image "$D_1$" can include (i) one or more smooth pixels, (e.g. pixels that have captured areas which have a substantially constant color (color homogenous regions)); and/or (ii) one or more texture pixels (e.g. pixels that have captured regions, e.g. areas which are in the transition between objects, lines, and color changes). It is difficult to detect blur from smooth pixels because these regions are homogenous. Thus, as provided herein, the present invention identifies and utilizes the textured regions to classify blur.

The method used to identify the textured regions can vary. In one non-exclusive embodiment, the step of identifying the textured pixels in the high pass image "$D_1$" includes, for each pixel 550, the steps of: (i) comparing the value to a certain predetermined H threshold value, and (ii) comparing the corresponding gradient value to a certain predetermined H gradient threshold. In this embodiment, for each pixel 550, (i) the pixel 550 is a textured pixel if its value is greater than or equal to the certain H threshold value and its gradient value is greater than or equal to the certain H gradient threshold, or (ii) the pixel 550 is a smooth pixel if its value is less than the certain H threshold value or its gradient value is less than the certain H gradient threshold. The values of the certain predetermined H threshold value, and the certain predetermined H gradient threshold can be varied to change the characteristics of the system.

In Equation 6 below, $T_1$ represents identified texture regions in the high-pass filter image "$D_1$":

$$T_1 = D_1 >= \text{textureTH}_1\ \&\ \text{gradientG} >= \text{gradientTH}\qquad\text{Equation 6}$$

Where gradientG is the gradients of image G, textureTH$_1$ represents the certain predetermined H threshold value, and gradientTH represents the certain predetermined H gradient threshold.

FIG. 5C is a simplified illustration the textured regions $T_1$ of the portion of the high pass filtered image "$D_1$" of FIG. 5A. In this embodiment, a binary image is used with the textured regions $T_1$ of the high pass filtered image "$D_1$" represented as "1's" and the smooth regions represented as "0's". In this example, (i) pixel $A_H$ was classified as a smooth pixel because either its value was less than the certain H threshold intensity value or its gradient value was less than the certain H gradient threshold, and (ii) pixel $B_H$ was classified as a textured pixel because both its value was greater than or equal to the certain H threshold intensity value and its gradient value was greater than or equal to the certain H gradient threshold.

Alternatively, the textured pixels in the high pass image "$D_1$" can be identified in a different fashion.

At step 410, the texture regions in the band pass image "$D_2$" are identified. As provided herein, the pixels 552 of the band pass image "$D_2$" can be characterized based on the texture of the areas that they capture. For example, the band pass image "$D_2$" can include (i) one or more smooth pixels, (e.g. pixels that have captured areas which have a substantially constant color (color homogenous regions)); and/or (ii) one or more texture pixels (e.g. pixels that have captured regions, e.g. areas which are in the transition between objects, lines, and color changes).

In one non-exclusive embodiment, the step of identifying the textured pixels in the band pass image "$D_2$" includes, for each pixel 552, the steps of: (i) comparing the value to a certain predetermined B threshold value, and (ii) comparing a gradient value to a certain predetermined B gradient threshold. In this embodiment, for each pixel 552, (i) the pixel 552 is a textured pixel if its value is greater than or equal to the certain B threshold intensity value and its gradient value is greater than or equal to the certain B gradient threshold, or (ii) the pixel 552 is a smooth pixel if its intensity value is less than the certain B threshold intensity value or its gradient value is less than the certain B gradient threshold. The values of the certain predetermined B threshold value, and the certain predetermined B gradient threshold can be the same for different than the values used for the high pass image "$D_1$".

In Equation 7 below, $T_2$ represents identified texture regions in the band pass image "$D_2$":

$$T_2 = D_2 >= \text{textureTH}_2 \text{ \& gradientG} >= \text{gradientTH} \quad \text{Equation 7}$$

Where gradientG is the gradients of image G, $\text{textureTH}_2$ represents the certain predetermined B threshold value, and gradientTH represents the certain predetermined B gradient threshold.

Alternatively, the textured pixels in the band pass image "$D_2$" can be identified in a different fashion.

FIG. 5D is a simplified illustration the textured regions of the portion of the band pass filtered image "$D_2$" of FIG. 5B. In this embodiment, a binary image is used with the textured regions $T_2$ of the band pass filtered image "$D_2$" represented as "1's" and the smooth regions represented as "0's". In this example, (i) pixel $A_B$ was classified as a smooth pixel because either its value was less than the certain B threshold value or its gradient value was less than the certain B gradient threshold, and (ii) pixel $C_B$ was classified as a textured pixel because both its intensity value was greater than or equal to the certain B threshold intensity value and its gradient value was greater than or equal to the certain B gradient threshold.

Finally, at step 412, the set of sharpness features for the image "G" are calculated utilizing the textured regions $T_1$ of the high pass image "$D_1$", and the textured regions $T_2$ of the band pass image "$D_2$". Stated in another fashion, after identifying the texture regions $T_1$, $T_2$, the present invention calculates the set of sharpness features from the identified texture regions $T_1$, $T_2$. The number of separate sharpness features in the set of sharpness features can be varied to achieve the desired accuracy and speed of the system. In one embodiment, the present invention utilizes six separate sharpness features, namely a first sharpness feature $F_1$, a second sharpness feature $F_2$, a third sharpness feature $F_3$, a fourth sharpness feature $F_4$, a fifth sharpness feature $F_5$, and a sixth sharpness feature $F_6$. It should be noted that the terms first, second, third, fourth, fifth and sixth are used merely for convenience and that any of the sharpness features can be referred to as the first, second, third, fourth, fifth or sixth sharpness feature. In this example, the six sharpness features can be calculated from the identified texture regions $T_1$, $T_2$ with the aim to capture the sharpness characteristics. Further, the methods used to calculate each of the sharpness features can be varied.

In one embodiment, the six sharpness features for each image are as follows:

(i) the first sharpness feature $F_1$ represents the percentage of the texture regions $T_2$ related to the whole band pass image "$D_2$"; the first sharpness feature $F_1$ is expressed in Equation 8 below:

$$F_1 = \text{number of texture pixels } T_2/\text{total number of pixels in } T_2 \quad \text{Equation 8.}$$

In the example of the texture regions $T_2$ of the band pass image "$D_2$" illustrated in FIG. 5D, there are ten textured pixels and twenty-five total pixels. Thus, in this example $F_1 = 0.4$ (10/25).

Alternatively, for example, the first sharpness feature $F_1$ can represent the percentage of the texture regions $T_1$ related to the whole high-pass filtered image "$D_1$".

(ii) the second sharpness feature $F_2$ represents the mean energy of texture regions "$T_1$" in the high pass image "$D_1$"; the second sharpness feature $F_2$ is expressed in Equation 9 below:

$$F_2 = \text{mean}(D_1(T_1==1)) \quad \text{Equation 9}$$

Basically, in this embodiment, referring to FIGS. 5A and 5C, pixels $B_H$, $C_H$, $H_H$, $I_H$, $J_H$, $L_H$, $M_H$, and $Y_H$ were identified as texture pixels. In this embodiment, the values of these texture pixels (from the high pass image "$D_1$") are added together and divided by the total number of texture pixels (e.g. eight in this example) to determine the mean energy of texture regions "$T_1$" in the high pass image "$D_1$". Thus, the texture regions "$T_1$" in the high pass image "$D_1$" is used as a mask to calculate the mean energy from only the textured pixels of the high pass image "$D_1$".

(iii) the third sharpness feature $F_3$ represents the mean energy of texture regions "$T_2$" in the band pass image "$D_2$"; the third sharpness feature $F_3$ is expressed in Equation 10 below:

$$F_3 = \text{mean}(D_2(T_2==1)) \quad \text{Equation 10}$$

Basically, in this embodiment, referring to FIGS. 5B and 5D, pixels $C_B$, $F_B$, $G_B$, $M_B$, $N_B$, $P_B$, $Q_B$, $R_B$, $S_B$, and $W_B$ were identified as texture pixels. In this embodiment, the values of these texture pixels (from the band pass image "$D_2$") are added together and divided by the total number of texture pixels (e.g. ten in this example) to determine the mean energy of texture regions "$T_2$" in the band pass image "$D_2$". Thus, the texture regions "$T_2$" in the band pass image "$D_2$" is used as a mask to calculate the mean energy from only the textured pixels of the band pass image "$D_2$".

(iv) the fourth sharpness feature $F_4$ represents the ratio of the mean energy difference between the texture regions "$T_1$" in the high pass image "$D_1$" and the texture regions "$T_2$" in band-pass image filtered image "$D_2$", to the mean energy of the texture regions "$T_1$" in the high pass image "$D_1$"; the fourth sharpness feature $F_4$ is expressed in Equation 11 below:

$$F_4 = (F_2 - F_3)/F_2 \quad \text{Equation 11}$$

Alternatively, for example, Equation 11 could be changed to divide by $F_3$, to provide ratio information regarding the images $D_1$, $D_2$.

(v) the fifth sharpness feature $F_5$ represents the mean ratio of per texture pixel energy in band pass image "$D_2$" to the combined energy of band pass image "$D_2$" and high pass image "$D_1$"; the fifth sharpness feature $F_5$ is expressed in Equation 12 below:

$$F_5 = \text{mean}(D_2(T_1==1)/(D_1(T_1==1)+D_2(T_1==1))) \quad \text{Equation 12}$$

Basically, in this embodiment, referring to FIGS. 5A, and 5C, pixels $B_H$, $C_H$, $H_H$, $I_H$, $J_H$, $L_H$, $M_H$, and $Y_H$ were identified as texture pixels "$T_1$". In this embodiment, (i) the value from the band pass image "$D_2$" (illustrated in FIG. 5B) for each textured pixel "$T_1$" is divided by (ii) combined energy for that pixel from the high pass image "$D_1$" and the low-pass filtered image "$D_2$". After this is done for all of the texture pixels "$T_1$", the mean value is subsequently calculated to determine $F_5$. In the equations provided herein, the symbol "·/" is used to represent that division is processed in each pixel of the image.

For example, because pixel $B_H$ was identified as having texture, the value for this pixel is calculated by taking the value at $B_B$ and dividing it by the sum of the value at $B_H$ plus $B_B$. This process is repeated for pixels $C_H$, $H_H$, $I_H$, $J_H$, $L_H$, $M_H$, and $Y_H$. The values are then added and subsequently divided by the total number of texture pixels "$T_1$".

Thus, the texture regions "$T_1$" in the high pass image "$D_1$" is used as a mask to calculate the fifth sharpness feature $F_5$ using the band pass image "$D_2$" and the high pass image "$D_1$".

(vi) the sixth sharpness feature $F_6$ represents the mean ratio of per texture pixel energy in band pass image "$D_1$" to the combined energy of band pass image "$D_2$" and high pass image "$D_1$"; the sixth sharpness feature $F_6$ is expressed in Equation 13 below:

$$F_6 = \mathrm{mean}\, (D_2(T_2==1)\cdot/(D_1(T_2==1)+D_2(T_2==1))) \qquad \text{Equation 13.}$$

Basically, in this embodiment, referring to FIGS. 5B, and 5D, pixels $C_B$, $F_B$, $G_B$, $M_B$, $N_B$, $P_B$, $Q_B$, $R_B$, $S_B$, and $W_B$ were identified as texture pixels "$T_2$". In this embodiment, (i) the value from the band pass image "$D_2$" (illustrated in FIG. 5B) for each textured pixel "$T_2$" is divided by (ii) combined energy for that pixel from the high pass image "$D_1$" and the low-pass filtered image "$D_2$". After this is done for all of the texture pixels "$T_2$", the mean value is subsequently calculated to determine $F_5$.

For example, because pixel $C_B$ was identified as having texture, the value for this pixel is calculated by taking the value at $C_B$ and dividing it by the sum of the value at $C_H$ plus $C_B$. This process is repeated for pixels $F_B$, $G_B$, $M_B$, $N_B$, $P_B$, QB, RB, SB, and $W_B$. The values are then added and subsequently divided by the total number of texture pixels "$T_2$".

Thus, the texture regions "$T_2$" in the band pass image "$D_2$" is used as a mask to calculate the sixth sharpness feature $F_6$ using the band pass image "$D_2$" and the high pass image "$D_1$".

It should be noted that the system can be designed so that the set of sharpness features includes less than six or greater than six separate sharpness features calculated from the textured regions $T_1$ of the high pass image "$D_1$", and the textured regions $T_2$ of the band pass image "$D_2$".

The method provided above works well in detecting most types of blurred images. However, as provided herein, in certain embodiments, several adjustments can be made in the computation of the sharpness features to accommodate for different types of test images.

Motion Blur (e.g. Caused by Camera Shake)

In the event of possible motion blur, the portions of the captured objects in the test image that are parallel with the motion direction will appear as sharp, even though the image (training or test) suffers motion blur. In certain situations, the methods described above may lead to an incorrect classification that the test image is sharp. Thus, in some embodiments, (i) it can be desirable to test for motion blur of the training image prior to generating the training model, and (ii) it can be desirable to test for motion blur of the test image prior to image classification. For example, in certain embodiments, the present invention first estimates if the image has possible motion blur and in the event possible motion blur is detected, the image is handled slightly differently. More specifically, if the probability of motion blur exceeds a certain threshold, the respective image is considered to have motion blur and the respective sharpness features are computed from oriented high-pass and oriented band pass images, and the orientation of the filter is the same as the estimated motion blur direction of the respective image.

Figure 6:
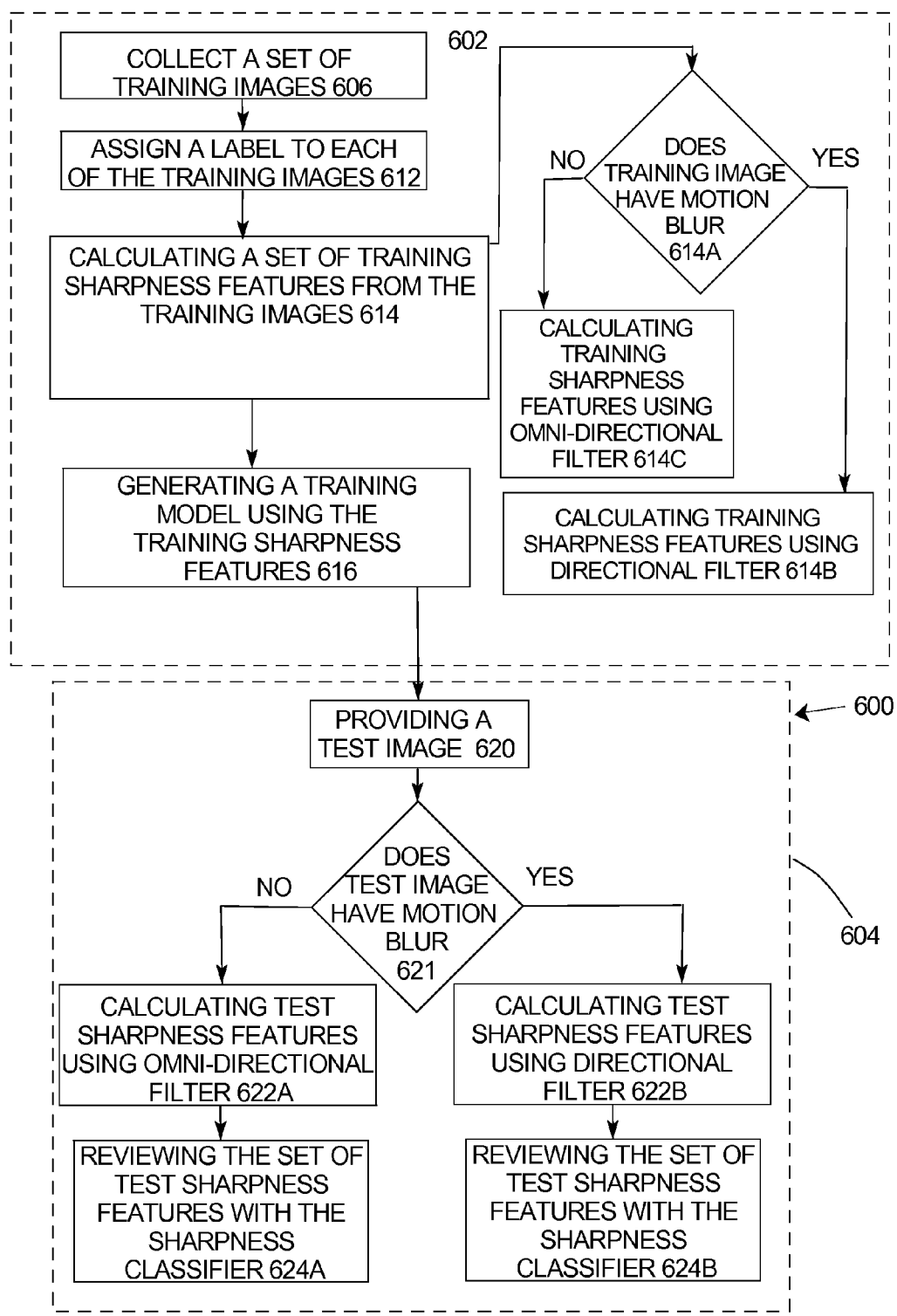
FIG. 6 is a flow chart that illustrates another embodiment of an image classification procedure having features of the present invention.

FIG. 6 is a flow chart that illustrates another embodiment of an image classification procedure 600 having features of the present invention. In this embodiment, the image detection process 600 includes a training phase 602 (illustrated as dashed box) and a predicting phase 604 (illustrated as dashed box) somewhat similar to the embodiment illustrated in FIG. 3. However, it is adjusted to test for motion blur.

More specifically, in FIG. 6, during the training phase 602, (i) at step 606, the set of training images is collected (similar to step 306 described above); (ii) at step 612, the training images are labeled (similar to step 312 described above); (iii) at step 614, a set of training sharpness features from the training images are calculated; and (iv) at step 616, a training model is generated for the sets of training sharpness features (similar to step 316 described above). It should be noted that step 614 can include step 614A of testing for motion blur of the training image; and (i) in the event the possibility of motion blur of the training image exceeds a certain threshold, the training image is considered to have motion blur and, at step 614B, the respective training sharpness features are computed from oriented high-pass and oriented band pass images, and the orientation of the filter is the same as the estimated motion blur direction of the respective image, and (ii) in the event the possibility of motion blur of the training image does not exceed a certain threshold, the training image is not considered to have motion blur, and at step 614C, the training image is processed with an omni-directional filter similar to step 314 described above. The method used for estimating if the training image has motion blur (step 614A) is substantially the same as the method (step 621) used for estimating if the test image has motion blur described in detail below. Further, the method used for calculating the training sharpness features (step 614B) for a training image estimated to have motion blur is substantially the same as the method (step 622B) used for calculating the test sharpness features for a test image estimated to have motion blur described in detail below.

In one embodiment, the predicting process 604 includes: (i) at step 620, providing the test image; and (ii) at step 621, estimating if there is motion blur in the test image, and if so, estimating the motion blur direction. Subsequently, if it is determined that there is no motion blur, (i) at step 622A, the set of test sharpness features is calculated using an omni-directional filter; and (ii) at step 624A, the set of test sharpness features are compared to the training model to estimate if the test image is blurred. Alternatively, if it is determined that there is motion blur along a first direction, (i) at step 622B, the set of test sharpness features is calculated using a directional filter that is oriented in the first direction; and (ii) at step 624B, the set of test sharpness features are compared to the training model to estimate if the test image is blurred.

The method used at step 621 for estimating if there is motion blur in the test image and estimating the motion blur direction can vary. Typically, in an image with motion blur, the edges of the objects along the motion direction remain sharp. Thus, an image with large motion blur will likely have a dominant gradient direction related to the motion blur direction. In one embodiment, the method provided herein checks to determine whether there exists a dominant gradient direction. In certain embodiments, when evaluating gradient directions, long edge structures in the image should be identified and excluded from the computation of dominant gradient orientation. These long edges/structures are likely not caused by motion blur. In one embodiment, the gradient directions are computed from a downsampled test image to reduce computational complexity. Long edge structures will still remain as edge structures in a downsampled much smaller image; while short edge structures most likely will disappear in a much smaller image.

In one, non-exclusive embodiment, the dominant gradient direction can be estimated using principle component analysis (PCA). In this embodiment, a data set is formed from all the detected edge pixels, each data set contains two components: a x-direction gradient, a y-direction gradient. Next, PCA is applied to these data sets to extract the $1^{st}$ component direction and its variance, $2^{nd}$ component direction and its variance. As provided herein, the ratio of the $1^{st}$ component variance to the $2^{nd}$ component variance can be compared to some threshold to determine if there exists dominant gradient direction. If yes, the $1^{st}$ component direction is the corresponding gradient direction.

The steps used for calculating the subsets of training sharpness features for each training image, and the set of test sharpness features for each test image are somewhat similar to the steps described above. As provided herein, the first subset of the sets of training sharpness features and the set of test sharpness features can be calculated using the omni-directional low pass filter "H" to obtain the high pass image "$D_1$" and band pass image "$D_2$". With this design, the associated first and sixth sharpness features $F_1$ to $F_6$ capture very well the sharpness characteristics of an image "G" that is independent of sharp structure orientations.

However, for motion blurred images, these features may capture sharp structures with orientations following the motion blur direction. Therefore, in certain embodiments, for test images suffering motion blur, an oriented filter "OH" (e.g. oriented with the direction of motion blur) that is low pass in the direction of the motion blur can be used to compute an oriented high-pass filter image "$OD_1$" and an oriented band pass image "$OD_2$" and compute similar sharpness features accordingly. With this design, the sharpness features $OF_1$, $OF_2$, $OF_3$, $OF_4$, $OF_5$, $OF_6$, extracted from textures regions $OT_1$, $OT_2$ associated with the oriented high pass image "$OD_1$" and band pass image "$OD_2$" measure the sharpness degree only along motion blur direction, thus avoiding capturing sharp structures following motion blur direction. In this embodiment, the oriented filter is used to calculate the second subset of the sets of training sharpness features and the test sharpness features.

As provided herein, the oriented high pass image $OD_1$ and the oriented band pass image $OD_2$ are calculated in a similar manner as the computation of the $D_1$ and $D_2$ described above in reference to FIG. 4. The differences here are replacing the omni-directions low pass filter H with an oriented low pass filter aligning with the estimated motion blur direction.

Similarly, the texture regions in the oriented high-pass $OT_1$ and the oriented band pass images $OT_2$ can be identified in a similar fashion as the texture regions were identified in the omni-directional images described above. This can be expressed as follows:

$OT_1 = OD_1 >= \text{textureTH}_1$ & gradientG>=gradientTH
$OT_2 = OD_2 >= \text{textureTH}_2$ & gradientG>=gradientTH Further, the oriented sharpness features can be calculated from texture regions of the oriented high-pass and band pass images, similar to sharpness features extracted from omni-oriented high-pass and band pass images:

(1). The first oriented sharpness feature $OF_1$ measures the percentage of texture regions from oriented band pass image related to the whole image.

(2). The second oriented sharpness feature $OF_2$ measures the mean energy of textures in the oriented high-pass image.

(3). The third oriented sharpness feature OF3 measures the mean energy of textures in the oriented band-pass image.

(4). The fourth oriented sharpness feature $F_4$ measures the ratio of mean energy difference between textures in the oriented high-pass and band pass images to the mean energy of textures in the oriented high pass image. ($OF_4=(OF_2-OF_3)/OF_2$)

(5). The fifth oriented sharpness feature $OF_5$ and the sixth oriented sharpness feature $OF_6$ measure the mean ratio of per texture pixel energy in the oriented band-pass filtered to the combined energy of the oriented band-pass and high pass images.

In summary, if there is no motion blur in the test image, the omni-directional six sharpness features $F_1, F_2, \ldots, F_6$ are collected. Alternatively, if there is detected motion blur in the test image, the six oriented features $OF_1, OF_2, \ldots, OF_6$ are collected to reflect the sharpness characteristics along detected motion blur direction.

Additionally, in certain embodiments, several other unique adjustments in computation of the sharpness features are used to accommodate the different sharpness characteristics of some challenging image types, such as high noise images, night scene/indoor scene images, macro/close-up images, etc. In one embodiment, the special image types can be quickly and simply identified based on metadata information, and the sharpness feature computation can be adjusted accordingly. In the situation where metadata information is not available, the test sharpness features are calculated without any specific adjustments.

Alternatively, one or more image analysis-based methods can be used to identify the special image types. Still alternatively, the image analysis methods can be combined with the metadata information to further enhance the detection accuracy of special image types.

High Noise Level Images

As is known, a very small amount of noise may increase sharpness slightly in a test image, however, a large amount of noise deteriorates the sharpness of the test image. Stated in another fashion, sharpness is perceived differently between an image with normal to low noise level and an image with high noise level. Thus, the following adjustments can be made to accommodate the special sharpness characteristics of high noise level image.

Figure 7:
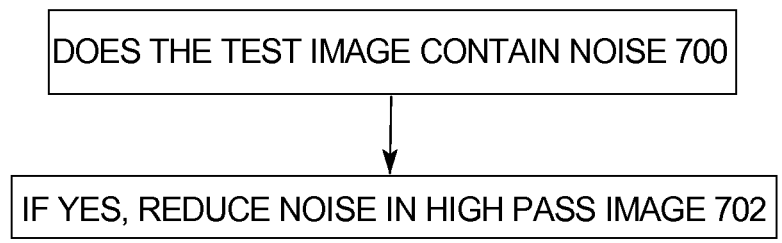
FIG. 7 is a flow chart that illustrates a variation to the classification procedure.

Referring to FIG. 7, in certain embodiments, the classification process also includes, at step 700 evaluating the test image to determine if it likely contains noise, and at step 702 the step of reducing/removing noise from the high pass image or the oriented high pass image. For a high noise image, a simple noise reduction method can be used to remove pixels related to noise in the extracted texture regions of the high pass image (or the oriented high pass image).

$T_1 = D_1 >= \text{textureTH}_1$ & gradientG>=gradientTH
$T_1 = T_1$ & noise_reduction($T_1$)
Or
$OT_1 = OD_1 >= \text{textureTH}_1$ & gradientG>=gradientTH
$OT_1 = OT_1$ & noise_reduction($OT_1$)

In one embodiment, the noise reduction is performed using a simple noise reduction filter (such as a 3×3 median filter, or linear ordered filter).

After the noise reduction process, texture regions in high pass image (or the oriented high pass image) contain mostly real sharp structures inside image rather than noises. Therefore features such as $F_2$, $OF_2$ can correctly reflect the sharpness characteristics of the image instead of suffering degradation due to heavy noises. Thus, in certain embodiments, the noise reduction is only applied to the high pass image (and not the band pass image) because image noise mainly influences the high pass image, while the band-pass image is robust to image noise.

In one embodiment, metadata information is used to identify an image with high noise level. More specifically, the ISO level of the test image can be compared with a certain ISO_threshold to estimate if the image has high noise or not. When ISO metadata information is not available, the test image can be processed as if the test image does not have noise.

Night/Indoor Scenes with very Low Exposure Values

Figure 8:
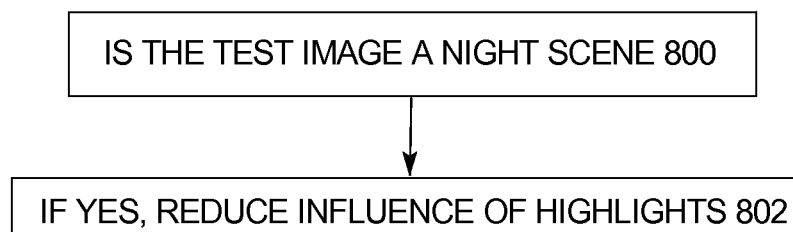
FIG. 8 is a flow chart that illustrates another variation to the classification procedure.

Many night/indoor scenes contain highlights caused by direct/indirect light sources. The presence of highlights in blurry night/indoor scenes poses a great challenge for blur identification, as they often appear like sharp edges or textures. Referring to FIG. 8, in certain embodiments, the classification process also includes, at step 800 evaluating the test image to determine if it is likely a night/indoor scene, and if so, at step 802 reduce the influence of these highlights and their vicinities in sharpness feature computation to improve the classification performance of blurry night/indoor scenes. Step 802 can be done by carefully selecting and masking out highlights-related regions while avoiding over-masking crucial sharp structures in sharp night/indoor scenes.

In one embodiment, for night/indoor scenes, the highlights-related regions are identified by checking high gradients and expanding them in small neighborhoods. For example, the high gradient threshold can be selected as a preset lower boundary $grad\_th_1$ (e.g., 80). An additional constraint can be added to require it not to exceed a certain upper boundary $grad\_th_2$, which is decided as the top n-per (e.g., 10%, 15%) gradient value among all non-smooth pixels. A non-smooth pixel is defined as one that has a gradient value higher than a certain threshold. The purpose of introducing the upper threshold $grad\_th_2$ is to reduce the risk of over-masking problem. Alternatively, the gradient information can be combined with color information to further improve the highlights masking process.

Once highlights-related regions are identified, these highlights-related regions are excluded from the texture regions of the high pass image and the band pass image. Similarly, when possible motion blur is detected, the highlights-related regions are excluded in texture regions of the oriented highpass and band pass images.

When metadata information is available, the night/indoor scenes can be detected using the exposure value (EV) information. For example, a considerably low EV_threshold (e.g., 6) can be selected to identify night/indoor scenes to avoid falsely identify other non-night/indoor scenes. Additionally, images captured with a flash can be excluded as being a night scene. When metadata information is not available, the test image can be processed as if the test image is not a night scene.

Macro/Close-Up Type Images

The perceived sharpness standard for macro/close-up type images seems slightly relaxed compared with other image types. It is possible that perceptual sharpness may be associated with scene content: people tend to be more strict with the sharpness of landscape type images, but less strict to macro/close-up natural scenes. Furthermore, it is also possible that perceptual sharpness may be associated with the depth of field (DOF) present inside image. Low DOF image most likely contain heavily out-of-focus blur regions, therefore by contrast, people may perceive the image as sharp though it may contain some slightly blurred foreground.

Figure 9:
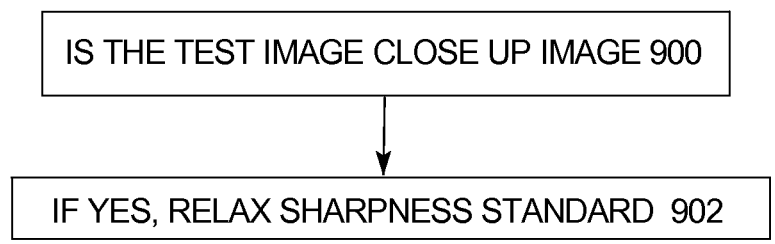
FIG. 9 is a flow chart that illustrates yet another variation to the classification procedure.

Referring to FIG. 9, in certain embodiments, the classification process also includes, at step 900 evaluating the test image to determine if it is a macro/close-up type image, and if so, at step 902 slightly relaxing the sharpness standard, by adjusting the computation of sharpness features for macro/close-up type test images.

Intuitively, a slightly down-sampled image appears sharper than its original resolution. In one embodiment, the present invention utilizes a slightly increased down-sampling factor to process macro/close-up type test images than other test image types. For example, for non-macro images, a downsizing factor of one-third can be used to obtain the reduced size image. Alternatively, for a macro/close-up type image, a slightly different downsizing factor, e.g. one-forth can be used to get a slightly sharper version than that from using factor one-third.

It should be noted that there are other ways to adjust the algorithms to accommodate the slightly relaxed sharpness standard for macro/close-up type images. One way would be to relax the sharpness threshold towards blurry side in the trained sharpness classifier (e.g. LDA) for macro/close-up type images without adjustment in the sharpness feature computation.

In one, non-exclusive embodiment, the macro/close up images can be identified mainly based on magnification factor. In order to compute magnification factor, metadata information such as object distance and focal length are required (e.g. Magnification factor=focal length/(object distance−focal length)). Once computed, the magnification factor can be compared with a certain magnification_threshold (e.g., 0.1), and the test image will be considered a macro/close-up types when it exceeds the magnification_threshold. When metadata information is un-available to calculate magnification factor, the image is classified as a non-macro/close-up type by default, and no adjustments are made in the computation of the sharpness features.

For macro/close-up images with extremely low depth of field (DOF), additional adjustments can be made in the sharpness feature computation. The texture regions in the high pass image include not only sharp textures but also some slightly blurry textures. This is typically not a problem due to the presence of sufficient portions of sharp textures. However, for a sharp image with extremely low DOF, sharp texture portions can be extremely small compared with the slightly blurry textures. This can cause the second sharpness feature $F_2$ (mean value of textures in the high pass image) or the second oriented sharpness feature $OF_2$ (mean value of textures in the oriented high pass image) to be biased by the presence of the slightly blurry textures. In order to accurately reflect the sharp characteristics in images with extremely low DOF, the weak texture structures can be removed in the high pass image (or the oriented high pass image). The remaining texture regions are mainly affiliated with sharp textures in image after the proposed adjustment.

As provided herein, a total of six sharpness features, $F_1$ to $F_6$ or $OF_1$ to $OF_6$ are used to capture the sharpness characteristics of an image. Among these six sharpness features, the first sharpness feature $F_1$ (or $OF_1$) is implicitly used in the training/testing process, and the remaining five other sharpness features are explicitly used for training/testing sharpness classifier. The first sharpness feature $F_1$ or $OF_1$ measures the percentage of textures present in image. When the texture percentage is extremely low, information associated with texture regions is highly unreliable. Therefore, in the training process, images with extremely low texture percentage can be excluded to avoid causing instability of the classifier. Similarly, in testing process, a test image is classified as blurry if it contains extremely low level of texture percentage. In alternative non-exclusive embodiments, the test image has an extremely low texture percentage and is classified as blurry if is has a texture percentage of less than approximately 0.1, 0.05, 0.0025, or 0.001 percent.

Additionally, some interesting trends exist in the individual sharpness features such as $F_2$, $F_4$ or ($OF_2$, $OF_4$). From one side, these sharpness features show very high values with certain crispy sharp images such as text images, high contrast landscape images, etc. From the other side, these features reveal much lower values for blur images. As provided herein, experimentation reveals that there is a strong separation of sharp vs. blur based on these individual features. Therefore certain sharpness features can be checked first to identify certain crispy sharp images, before supplying the remaining five sharpness features to the sharpness classifier to predict sharp or blur.

In one non-exclusive embodiment, the test image is classified as sharp if the mean energy in the textured regions of the test high pass image ($F_2$ or $OF_2$) is greater than a second feature predetermined level. In one example, if the second test sharpness feature has been normalized to a [0 1] range, the second feature predetermined level can be 0.9. In this example, if the second test sharpness feature of the test image has a normalized value that is greater than 0.9, it is classified as sharp without doing any additional analysis. This typically only occurs in text-type images or high contrast landscape images. Alternatively, for example, the second feature predetermined level can be 0.95, or 0.97.

Alternatively or additionally, the test image can be classified as sharp if the ratio of mean energy difference between textures in the test band pass image to the mean energy of textures in the test high pass image ($F_4$ or $OF_4$) is greater than a fourth feature predetermined level. In one example, if the fourth test sharpness feature has been normalized to a [0 1] range, the fourth feature predetermined level can be 0.85. In this example, if the fourth test sharpness feature of the test image has a normalized value that is greater than 0.85, it is classified as sharp without doing any additional analysis. This typically only occurs in text-type images or high contrast landscape images. Alternative, for example, the fourth feature predetermined level can be 0.9 or 0.95.

It should be also noted that multiple sharpness classifiers can be generated to fit different application needs. For example, a special classifier can be trained to distinguish sharp or blur for images captured from DSLR type cameras, or for images captured from compact type cameras. Furthermore, a more sophisticated classification algorithm can be used instead of the LDA sharpness classification algorithm for further potential improvement.

In another embodiment, the model can provide various ranges of values that can predict, to a desired confidence level, the extent of the blur in a test image. For example, if the test image value falls within a particular range of values, the test image can be categorized as "slightly blurred", rather than "blurred". This may be helpful to the user since a slightly blurred image may be worthy of further image manipulation to correct the blur, while a blurred image may not be correctible, and can be deleted to free up memory space and/or avoid printing time and resources.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for determining if a test image is either sharp or blurred, the method comprising the steps of;
training a sharpness classifier to discriminate between sharp and blurred images, the sharpness classifier is trained based on a set of training sharpness features computed from a plurality of training images; and
applying the trained classifier to the test image to determine if the test image is sharp or blurred based on a set of test sharpness features computed from the test image;
wherein, the set of training sharpness features for each training image and the set of test sharpness features for each test image are computed by (i) preprocessing the respective image; (ii) generating a high pass image from the preprocessed image; (iii) generating a band pass image from the preprocessed image; (iv) identifying textured regions in the high pass image; (v) identifying texture regions in the band pass image; and (vi) computing the set of sharpness features from the identified textured regions.

2. The method of claim 1, wherein the step of preprocessing the respective image includes the steps of: (i) border-cropping; (ii) down sampling; and (iii) converting the image into a grey scale image.

3. The method of claim 1, wherein the step of generating the high pass image includes computing the absolute difference between the preprocessed image and a low pass filtered version of the preprocessed image.

4. The method of claim 1, wherein the step of generating the band pass image includes the step of computing the absolute difference between two levels of low pass filtering of the preprocessed image.

5. The method of claim 1, wherein the steps of generating a high pass image and generating a band pass image include utilizing an omni-directional type filter.

6. The method of claim 1, wherein the step of computing the set of sharpness features includes computing one or more of the following sharpness features:
(i) a measure of the texture percentage in the band pass image;
(ii) a measure of the mean energy in the textured regions of the high pass image;
(iii) a measure of the mean energy in the textured regions of the band pass image;
(iv) a measure of the ratio of mean energy difference between textures in the band pass image to the mean energy of textures in the high pass image; and
(v) a measure of the mean ratio of per texture pixel energy in the band pass image to the combined energy of the band pass image and the high pass image.

7. The method of claim 1 wherein the step of generating the high pass image and the step of generating the band pass image includes the use of an oriented filter.

8. The method of claim 7, wherein the oriented band pass image is generated by computing the absolute difference between two levels of oriented-type filtering of the grey scale image.

9. The method of claim 1, wherein the step of identifying the textured regions in the high pass image includes the steps of: constraining texture regions in the high pass image to be pixels with values in the high pass image that exceed a preset texture threshold; and constraining texture regions in the high pass image to be pixels with corresponding gradient values exceed a preset gradient threshold.

10. The method of claim 1 wherein the step of identifying the textured regions in the band pass image includes the steps of: constraining texture regions in the oriented band pass image to be pixels with values in the band pass image that exceed a preset texture threshold; and constraining texture regions in the band pass image to be pixels with corresponding gradient values exceed a preset gradient threshold.

11. The method of claim 1, further comprising the step of determining if there is motion blur in the test image, and wherein if it is determined that there is motion blur in the test image, the step of generating the high pass image and the step of generating the band pass image for the test image including the use of an oriented filter or if it is determined that there is not motion blur in the test image, the step of generating the high pass image and the step of generating the band pass image for the test image including the use of an omni-directional filter.

12. The method of claim 1, further comprising the step of determining if there is motion blur in the test image, (i) wherein if it is determined that there is not motion blur, the step of computing the sets of test sharpness features includes computing one or more of the following test sharpness features: (a) a measure of the texture percentage in the band pass image; (b) a measure of the mean energy in the textured regions of the high pass image; (c) a measure of the mean energy in the textured regions of the band pass image; (d) a measure of the ratio of mean energy difference between textures in the band pass image to the mean energy of textures in the high pass image; and (e) a measure of the mean ratio of per texture pixel energy in the band pass image to the combined energy of the band pass image and the high pass image, and (ii) wherein if it is determined that there is motion blur in the test image, the step of computing the sets of test sharpness features further includes computing one or more of the following test sharpness features: (a) a measure of the texture percentage from an oriented band pass image; (b) a measure of the mean energy in the textured regions in an oriented high pass image; (c) a measure of the mean energy in the textured regions of the oriented band pass image; (d) a measure of the ratio of mean energy difference between textures in the oriented band pass and the oriented band pass image to the mean energy of textures in the oriented high pass image; and (e) a measure of the mean ratio of per texture pixel energy in the oriented band pass image to the combined energy of the oriented band pass image and the oriented high pass image.

13. The method of claim 1, further comprising the steps of: identifying metadata associated with the test image; and using the metadata associated with the test image to aid in determining if the test image is sharp or blurred.

14. The method of claim 13, wherein the metadata includes one or more of the following: ISO noise level associated with the test image; an exposure value associated with the test image; magnification factor associated with the test image; and a depth of field factor associated with the test image.

15. The method of claim 13, further comprising the steps of: identifying a test image with high noise level based on an ISO value; and reducing noisy pixels in texture regions in the high pass image.

16. The method of claim 13, further comprising the steps of: identifying a test image with a very low exposure value; and removing pixels associated with highlights in the texture regions in the high pass image and the band pass image.

17. The method of claim 13, further comprising the steps of: identifying a test image with a high magnification factor; and slightly relaxing sharpness standard for the test image.

18. The method of claim 13, further comprising the steps of: identifying a test image with very shallow depth of field, and removing weak texture structures in the texture regions of the high pass image.

19. A method for estimating if a test image is either sharp or blurred, the method comprising the steps of:
providing a sharpness classifier that is trained to discriminate between sharp and blurred images;
computing a set of test sharpness features for the test image using one or more of the following steps: (i) generating a test high pass image from the test image; (ii) generating a test band pass image from the test image; (iii) identifying test textured regions in the test high pass image; (iv) identifying test textured regions in the test band pass image; (v) evaluating the identified test textured regions in the test high pass image; and (vi) evaluating the identified test textured regions in the test band pass image; and
evaluating the test sharpness features using the sharpness classifier to estimate if the test image is sharp or blurry.

20. The method of claim 19 wherein the step of providing a sharpness classifier includes the step of training the sharpness classifier with a set of training sharpness features for each of a plurality of training images; and wherein the step of training the sharpness classifier includes the step of computing the set of training sharpness features for each training image by (i) generating a training high pass image from the training image; (ii) generating a training band pass image from the training image; (iii) identifying training textured regions in the training high pass image and the training band pass image; and (iv) evaluating the identified training textured regions in the training high pass image and the training band pass image.

21. The method of claim 19, wherein the steps of generating a high pass image and generating a band pass image include utilizing an omni-directional type filter.

22. The method of claim 19, wherein the step of computing the set of test sharpness features includes computing one or more of the following sharpness features: (i) a measure of the texture percentage in the test band pass image; (ii) a measure of the mean energy in the textured regions of the test high pass image; (iii) a measure of the mean energy in the textured regions of the test band pass image; (iv) a measure of the ratio of mean energy difference between textures in the test band pass image to the mean energy of textures in the test high pass image; and (v) a measure of the mean ratio of per texture pixel energy in the test band pass image to the combined energy of the test band pass image and the high pass image.

23. The method of claim 19 wherein the step of generating the test high pass image and the step of generating the test band pass image includes the use of an oriented filter.

24. The method of claim 19, further comprising the steps of: identifying a test image with high noise level based on an ISO value; and reducing noisy pixels in texture regions in the test high pass image.

25. The method of claim 19, further comprising the steps of: identifying a test image with a very low exposure value; and removing pixels associated with highlights in the texture regions in the test high pass image and the test band pass image.

26. The method of claim 19, further comprising the steps of: identifying a test image with a high magnification factor; and slightly relaxing sharpness standard for the test image.

27. The method of claim 19, further comprising the steps of: identifying a test image with very shallow depth of field, and removing weak texture structures in the texture regions of the test high pass image.

28. The method of claim 19 further comprising the steps of evaluating the test image to determine if it has an extremely low texture percentage, and classifying the test image with the extremely low texture percentage as being blurred.

29. The method of claim 19 further comprising the step of determining a mean energy in the textured regions of the test high pass image, and classifying the test image as sharp if this mean energy is greater than a predetermined level.

30. The method of claim 19 further comprising the step of determining a ratio of mean energy difference between textures in the test band pass image to the mean energy of textures in the test high pass image, and classifying the test image as sharp if the ratio is greater than a predetermined level.

31. A camera including a capturing system for capturing a test image, and a control system that utilizes the method of claim 19 to estimate if the test image is either sharp or blurred.

* * * * *